Figure 1:
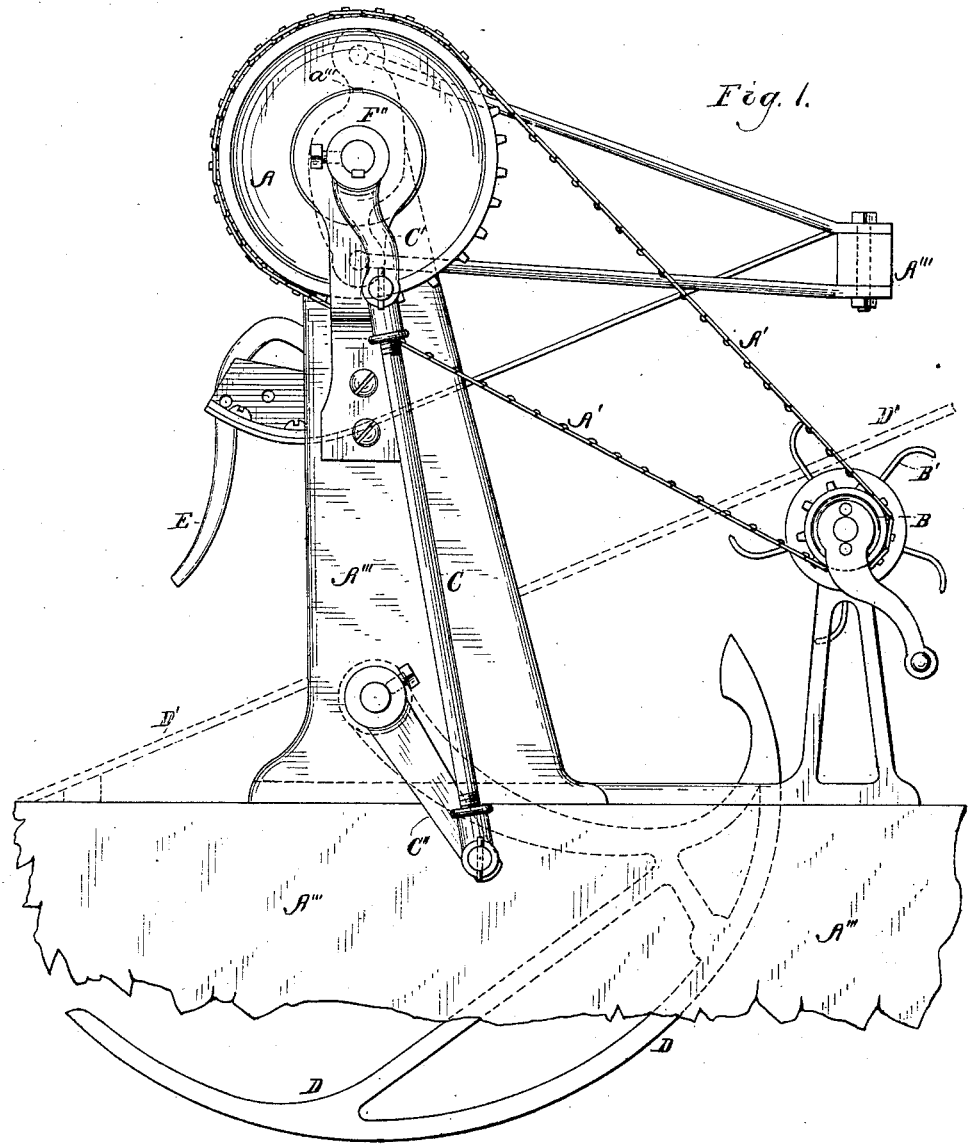

(Model.) 4 Sheets—Sheet 1.
C. COLAHAN.
GRAIN BINDER.

No. 358,918. Patented Mar. 8, 1887.

Witnesses.

Inventor.
Chas Colahan

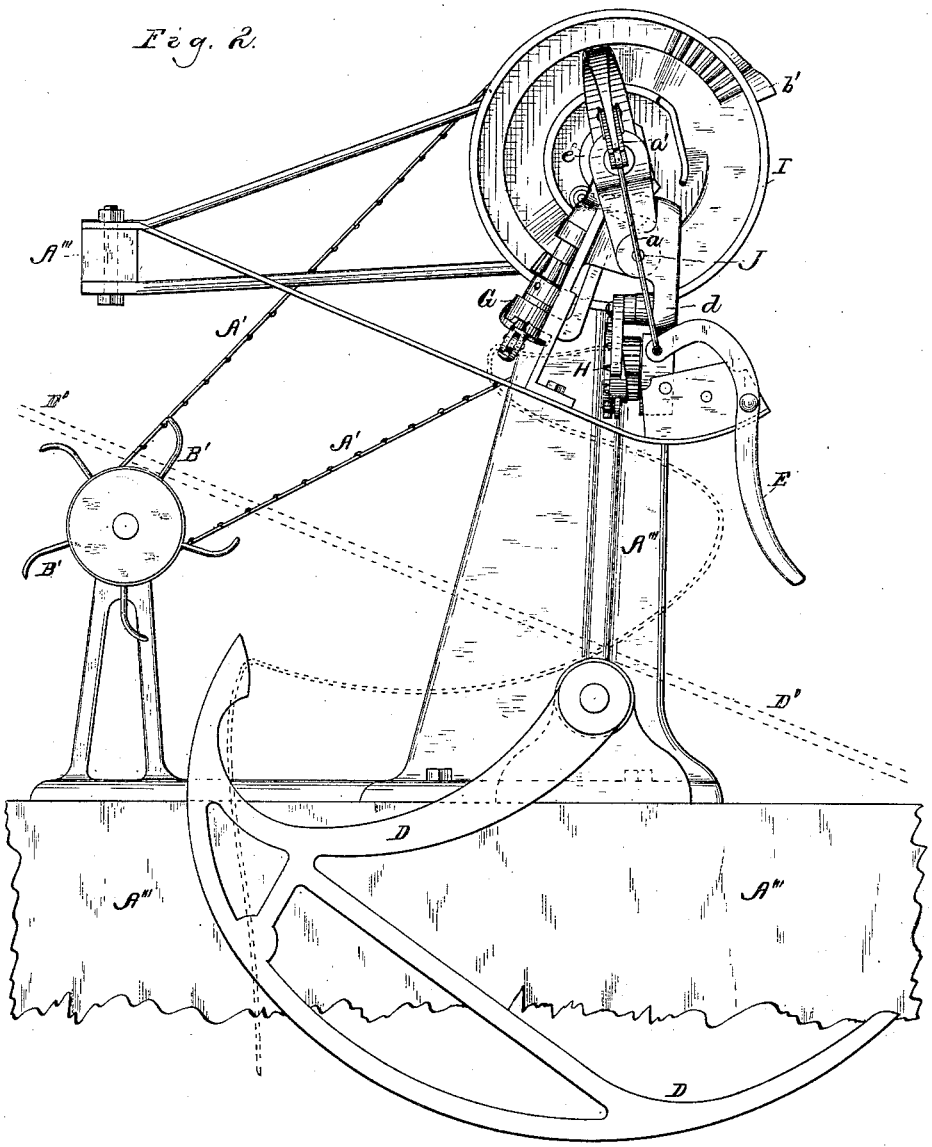

(Model.) 4 Sheets—Sheet 3.
C. COLAHAN.
GRAIN BINDER.
No. 358,918. Patented Mar. 8, 1887.
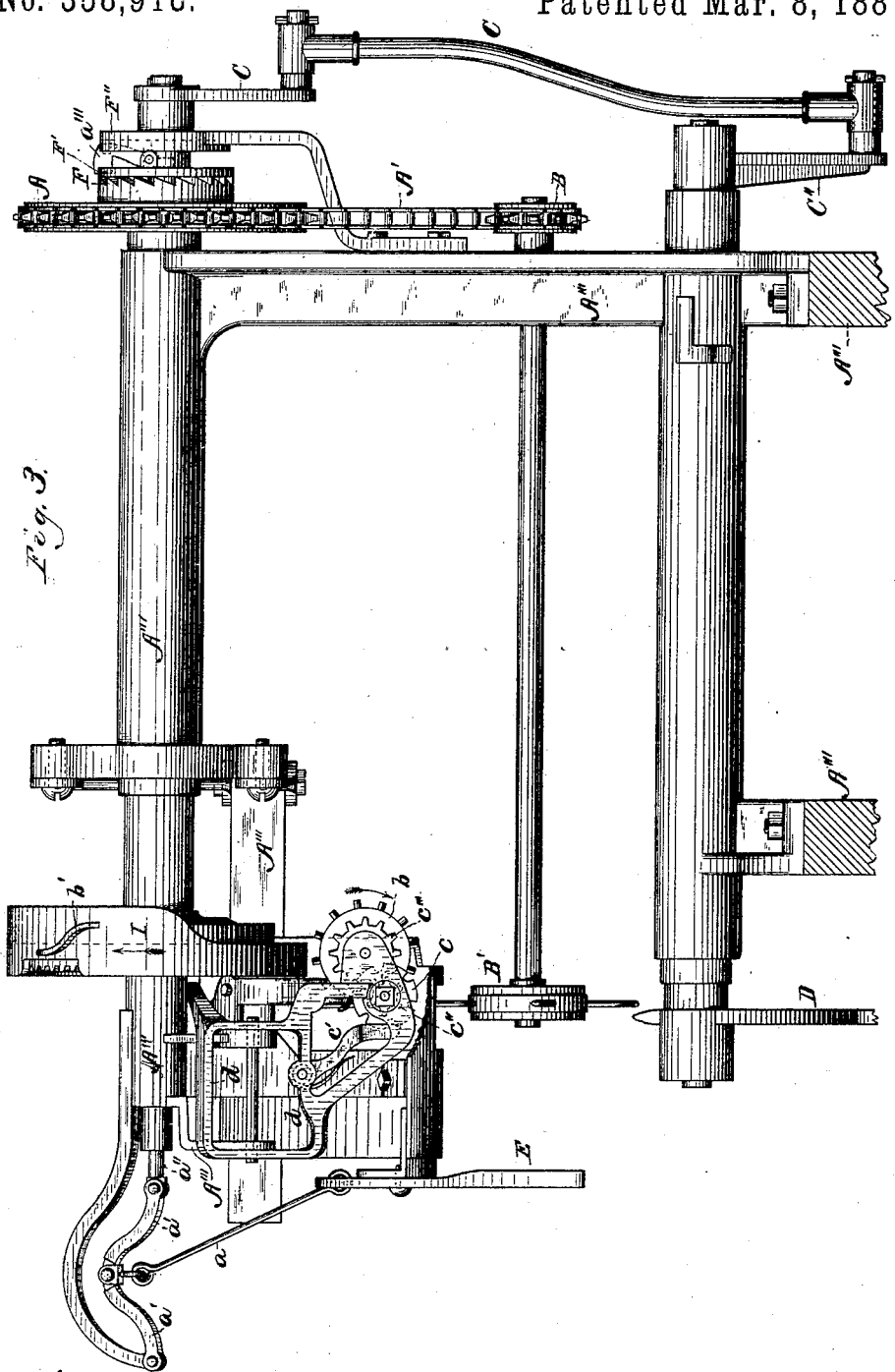
Witnesses. Inventor.

(Model.)
4 Sheets—Sheet 4.
C. COLAHAN.
GRAIN BINDER.
No. 358,918. Patented Mar. 8, 1887.
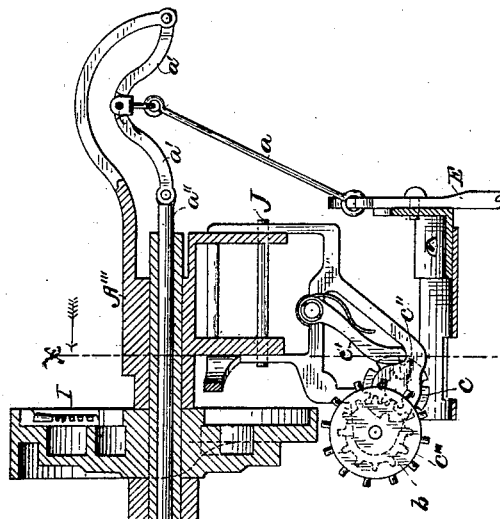
Fig. 7.
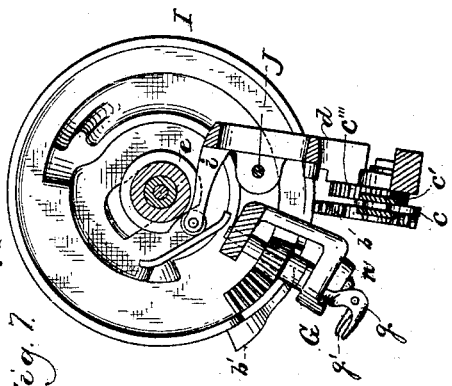
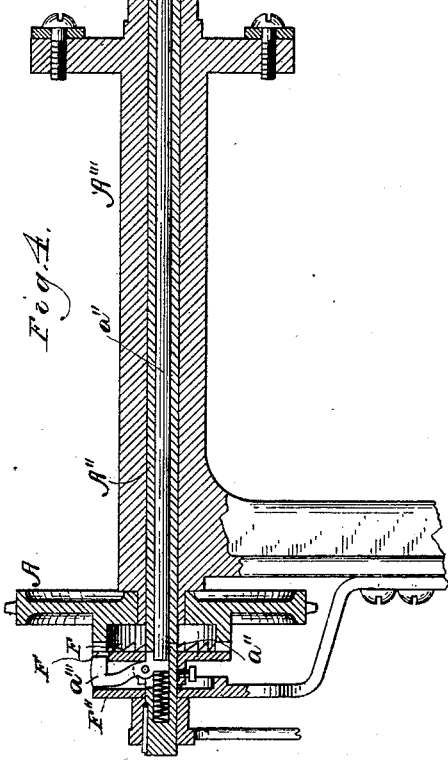
Fig. 4.
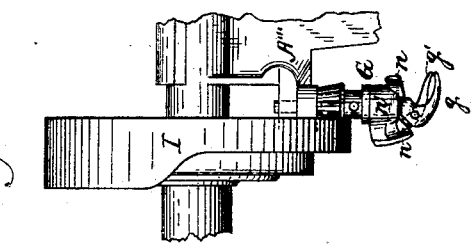
Fig. 6.
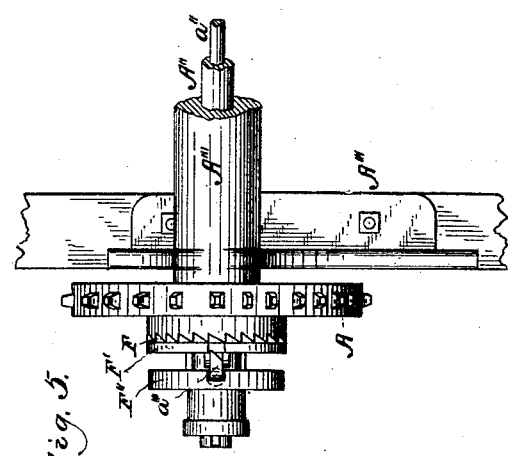
Fig. 5.
Witnesses
Inventor
Cha Colahan

UNITED STATES PATENT OFFICE.

CHARLES COLAHAN, OF CLEVELAND, OHIO.

GRAIN-BINDER.

SPECIFICATION forming part of Letters Patent No. 358,918, dated March 8, 1887.

Application filed July 23, 1883. Serial No. 101,615. (Model.)

*To all whom it may concern:*

Be it known that I, CHARLES COLAHAN, of Cleveland, Ohio, have invented certain new and useful Improvements in Grain-Binders, of which the following is a specification.

The invention relates to that class of binders which are attached to the harvester where the grain is delivered by the endless rake and the binder operated by mechanism connecting with the harvester mechanism by a clutch in such manner that the pressure of the accumulating grain against a yielding tripping-arm, when a certain quantity of grain is collected, will start the binder at the proper time, and the reverse movement or return of the tripping-arm, which occurs when the bundle is discharged, unclutches and stops the binder until another gavel is collected for binding.

The invention consists in the mechanism hereinafter shown for automatically starting the movements of the gavel-forming devices and tying mechanism when a predetermined quantity of grain is placed on the binding-table; also, in certain other improved mechanism, hereinafter described and claimed.

The accompanying drawings illustrate the invention. Figure 1 is an end elevation of such grain-binder. Fig. 2 is an elevation of the end opposite to that shown in Fig. 1. Fig. 3 is a front or side elevation. Fig. 4 is a longitudinal vertical section of a portion of Fig. 3. Figs. 5 and 6 are sections showing detached or partial views. Fig. 7 is a section on line $x\ x$ of Fig. 4, as seen when looking in the direction of the arrow.

A is a sprocket-wheel. A' is a chain-belt of the same. A'' is the main shaft, and A''' is the frame of the binder. The driving-chain belt connects wheel A with a wheel, B, which operates the packers B'. This wheel B is driven by and operates continuously with the harvester. The wheel A, which may be loosely placed upon shaft A'', but which is preferably placed loosely upon a sleeve or part of the frame A''', in which said shaft is journaled, is driven continuously by belt A' while the harvester is in motion. Said wheel has a flange projecting from one side, provided with serrations F. The shaft A'' has a disk, F', fixed upon it, which has a slot or notch in the outer edge and a radial spring-pawl, $a''''$, pivoted thereto, so that the end of the pawl may be projected through such slot and made to engage with the serrations F or ratchet on the flange of the main wheel A. When the pawl is so engaged, the wheel A is thereby clutched with and communicates its motion to the shaft A'' for operating the band-carrying arm and tying mechanism. Said shaft A'' is hollow, and has a clutch-tripping rod, $a''$, extending through it, with one end resting against or connecting with the lower end of the clutch spring-pawl $a'''$, while the opposite end of the rod is provided with a toggle-joint, $a'\ a'$, which is connected by a rod, $a$, to the binder-tripping arm E. This arm is pivoted on the knotter-frame, and the accumulating grain is packed against the lower end of the same, so that the pressure of the grain shall operate to bring the joint of the toggle-joint into line and thrust the rod $a''$ against the clutch-pawl $a'''$, so as to cause it to clutch wheel A with shaft A'', which starts the binder and operates the entire binder mechanism. The toggle-joint operates with considerable force and requires comparatively small power, and hence is a most efficient means for moving the clutching device.

When the engagement of the clutching-pawl is made, it is held in engagement by a supplemental disk or plate, F'', during one entire revolution of the wheel A, by which revolution the binder is operated until the sheaf is bound and discharged and the machine is disposed to receive another gavel, and at the completion of which the pawl is permitted to unclutch, and is forced by a spiral spring back into a slot or opening in the supplemental disk F'', the spiral spring operating against the lower end of the clutching-pawl, so as not only to cause disengagement of the shaft A'' from wheel A, but to engage said clutching-pawl with the stationary disk or plate and stop the motion of said main binder-shaft, and thereby stop and hold at rest all parts of the binder. The toggle-joint is not forced entirely in by the tripping-arm, but stands at the tripping of the binder, so that the counteracting-spring which operates the pawl in one direction will also push back the rod $a''$ and swing the tripping-arm forward when the shaft A'' stops at the completion of one revolution.

The band-carrying arm D and the compressing-arm (the latter not shown here) are operated by a pitman, C, which, with the crank C' C'', connects the shaft A'' with the rock-shaft of said band carrying and compressing arms.

D' shows the binder-table in dotted lines.

The notched disk band-holder and the frame D, which supports the band-holder, is pivoted at J to a downwardly-projecting portion of the frame A''', and has an arm, i, coming in contact with a cam, e, on the wheel I, which swings the bottom of the frame D toward and from the cord-tying bill, substantially the same as heretofore used.

The tying-bill g is journaled in and supported by a downwardly-projecting arm, G, from the frame A''', and is operated by the segment-gear on cam-wheel I. The operation of tying is performed by a single revolution of the tying-bill in the usual way. For operating the pivoted jaw g', I use a continuous cam track or way on the end of the projecting part G, in connection with the friction-roller, on the outer end of said pivoted jaw of the tying-bill g. As the shaft of the tying-bill rotates, this roller on the pivoted jaw travels in the cam-track, and is thereby deflected up and down alternately to close and open the jaw. The portion n of the cam-track projecting beyond and under the roller carries it up and so closes and maintains the jaw in its closed position, and the cam part n', projecting downwardly, presses against the upper side of the roller and forces it down, and so opens and maintains the jaw in its open position while seizing the cord, the upward-and-downward curvature of the track being so located as to open and close the jaw at the proper time in the operation of forming the knot. This continuous cam is formed by casting the same as integral with the part G.

In operation it will thus be observed that the construction of the binder places the entire binder tripping, clutching, and operating mechanism on the single supporting-frame over the binder-table, with a common center of motion, securing a positive simultaneous action of all the co-operative parts; and I desire to secure by Letters Patent—

1. In a grain-binding harvester, the combination of the frame A''', extending above the binder-table and having a tubular horizontal portion, a shaft, A'', having its bearing in the tubular portion of said frame, the continuously-running drive-wheel A, the intermittently-actuated wheel I, for operating the knotting mechanism, the clutch, the pendent trip located centrally over the binder-table, and connections from said trip extending through the tubular portion of the frame to the clutch, all being arranged to operate substantially as set forth.

2. The combination of the supporting-frame, the hollow shaft mounted therein, a knotter-actuating cam-wheel secured to the shaft, the continuously-running wheel that revolves independently of the shaft, the rod extending through the hollow shaft, the binder-tripping arm, connections between the rod and the binder-tripping arm, and a pivoted spring-pawl connected to and running with the hollow shaft and that is intermittently moved by said rod into engagement with the continuously-running wheel A, substantially as set forth.

3. In a grain-binder, the combination, with the frame, the hollow shaft, and pivoted spring clutching mechanism composed of the parts F, F', F'', and a''', of the tripping-arm E, the rod a'', and connections between the arm E and the rod a'', substantially as set forth.

4. In a grain-binder, the combination of the driving-wheel B, belt A', loose wheel A, shaft A'', radial spring-pawl a''', rod a'', toggle-joint levers a', rod a, and tripping-arm E, all arranged for joint operation, as shown and described.

5. In a grain-binder, the combination, with the frame, the shaft A'', having a slotted disk, F', and a radial spring-pawl, a''', pivoted thereto, of the flanged serrated wheel A, the sliding rod a'', and the toggle-jointed levers a', rod a, and tripping-arm E, substantially as specified.

CHAS. COLAHAN.

Witnesses:
JNO. H. WHIPPLE,
J. W. MERRIAM.